US012586383B2

(12) United States Patent (10) Patent No.: US 12,586,383 B2
Grauer (45) Date of Patent: Mar. 24, 2026

(54) CAMERA MONITOR SYSTEM, VEHICLE AND METHOD

(71) Applicant: MOTHERSON INNOVATIONS COMPANY LIMITED, London (GB)

(72) Inventor: Manuel Grauer, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 52 days.

(21) Appl. No.: 18/761,789

(22) Filed: Jul. 2, 2024

(65) Prior Publication Data

US 2025/0022282 A1 Jan. 16, 2025

(30) Foreign Application Priority Data

Jul. 11, 2023 (DE) ..................... 10 2023 118 365.6

(51) Int. Cl.
*G06V 20/56* (2022.01)
*H04N 23/695* (2023.01)
(52) U.S. Cl.
CPC ........... *G06V 20/56* (2022.01); *H04N 23/695* (2023.01)
(58) Field of Classification Search
None
See application file for complete search history.

(56) References Cited

U.S. PATENT DOCUMENTS

2016/0185297 A1* 6/2016 Boehm ..................... B60R 1/12
348/148
2016/0277651 A1* 9/2016 Sherman ................ G06V 10/44
2017/0305345 A1* 10/2017 Hashimoto .............. G06T 3/20

FOREIGN PATENT DOCUMENTS

DE 10 2017 212 519 B3 7/2018
DE 10 2021 005 530 A1 12/2021

* cited by examiner

*Primary Examiner* — Rebecca A Volentine
(74) *Attorney, Agent, or Firm* — Jones Day

(57) ABSTRACT

The disclosure relates to camera monitoring system (1) adapted or use with a vehicle (10) and providing a recorded image (RI) to a driver (2) of the vehicle (10), comprising a camera unit (3) for recording a scenery around the vehicle (10) with a certain viewing direction and a monitoring unit (4) for displaying the recorded image (RI) of the scenery, wherein the viewing direction can be adjusted by panning the camera unit (3) and/or, in case the recorded image (RI) has a size exceeding a display area (41) of the monitoring unit (4) resulting in shown and not-shown parts of the recorded image (RI), by adjusting the part of the recorded image (RI) visible on the display area (41) to display the recorded scenery around the vehicle (10) in a desired viewing direction, and wherein the camera monitoring system (1) is adapted to at least temporarily and/or on demand provide a static indication pattern (5) in the display area (41) in addition to the recorded image (RI) enabling the driver (2) to adjust the desired viewing direction relative to the static indication pattern (5) improving the driving security of the vehicle (10). The disclosure further relates to a vehicle (10) comprising such a camera monitoring system (1) and to a method (100) using such camera monitoring system (1).

14 Claims, 6 Drawing Sheets

CAMERA MONITOR SYSTEM, VEHICLE AND METHOD

CROSS-REFERENCE TO RELATED APPLICATIONS

This application claims priority to German Patent Application No. 10 2023 118 365.6 filed on Jul. 11, 2023, the entirety of which is herein incorporated by reference.

FIELD

The disclosure refers to a camera monitoring system, a vehicle and a method providing the recorded image with improved driving security to a driver of a vehicle using a camera monitoring system.

BACKGROUND

Vehicles, in particular motor vehicles, often comprise cameras to observe the driving situation around the vehicle. The recorded camera image is displayed to the driver via a monitor as part of a camera monitoring system (CMS).

The term "vehicles" denotes any means of transport, which may be cars, trucks, motor bikes etc.

The term "camera" denotes any unit, which is capable of optically recording a scenery, in particular comprising an optical lens as an entry aperture for electromagnetic radiation from the environment of the camera and an optical path inside the camera suitable to guide the received electromagnetic radiation to a suitable sensor, where the electromagnetic radiation is converted into an electronic signal or picture, where the properties of optical lens, optical path and sensor determine the resolution of the recorded scenery, which might be displayed on a monitor to a driver of a vehicle. The electromagnetic radiation received by the camera and converted by the sensor might be radiation of the infrared, visible and/or ultraviolet spectrum of wavelengths.

The term "monitor" denotes any unit, which is capable of displaying at least an image recorded by a camera.

FIG. 1 shows a perspective view of a driver cabin 13 of a vehicle 10 comprising several monitors 4 of a camera monitoring system according to prior art, where one monitor 4 comprises a digital or virtual interior mirror which is attached to the center of the front wind shield of the vehicle 10. Exterior mirrors 15 of the vehicle 10 may be conventional mirrors or virtual ones. While panning, zooming and/or tilting the monitor 4, displayed recorded images RI lack three-dimensional information making it difficult to find a perfect alignment and visually pleasing result for the displayed recorded image RI.

FIG. 2 shows a view of a rear 14 of the vehicle 10, indicating the arrangement of a camera 3 of the camera monitoring system. In addition to the problems described with reference to FIG. 1, further problems arise due to the fact that the camera 3 is not positioned in the center of the rear 14 of the vehicle 10. In fact, the position of the camera 3 is offset relative to the center axis 12 of the vehicle 10. Thus, there is a misalignment between the camera 3 and the monitor 4 resulting in a loss of geometric understanding between the field of view or viewing angle of the camera 3 and the displayed area of the monitor 4 when looking on it.

The driver needs an optical indication to align the own vehicle in relation to the image. Some rear-view cameras solve this problem by showing a bit of the vehicle rear bumper and/or virtual lines representing a vehicle track. The problem may also be solved by fixing the central axis of the vehicle in the center of the monitoring unit and disallowing panning the monitoring unit horizontally.

Since the loss of one degree of freedom restricts the driver to alignments of the monitor 4, some camera monitoring systems try to solve this problem by showing additional lines representing vehicle dimensions. FIG. 3 is a schematic view of a display screen of the monitor 4 providing a recorded image RI comprising lines 6 indicating vehicle geometrics.

However, the displayed images still may present a field of view with a mismatch between the main image direction and the image direction of highest importance for the diving security.

It is therefore desirable to provide a camera monitoring system enabling the driver to easily adjust the displayed image to a direction or region of highest importance to improve the driving security.

SUMMARY

An object of the present disclosure is to provide a camera monitoring system overcoming the drawbacks of the prior art, in particular enabling the driver to easily adjust the displayed image to a direction or region of highest importance to improve the driving security.

This object is solved by a camera monitoring system adapted to use with a vehicle and providing a recorded image to a driver of the vehicle comprising a camera unit for recording a scenery around the vehicle with a certain viewing direction and a monitoring unit for displaying the recorded image of the scenery, where the viewing direction can be adjusted by panning the camera unit and/or in case the recorded image has a size exceeding the display area of the monitoring unit resulting in shown and not-shown parts of the recorded image by adjusting the part of the recorded image visible on the display area to display the recorded scenery around the vehicle in a desired viewing direction and wherein the camera monitoring system is adapted to at least temporarily and/or on demand provide a static indication pattern in the display area in addition to the recorded image enabling the driver to adjust the desired viewing direction relative to the static indication pattern improving the driving security of the vehicle.

The monitoring unit might be any suitable unit to display a recorded image to a viewer, here the driver. The monitoring unit may comprise a display with sufficient resolution to provide a virtual interior mirror and/or as a separate display on the dashboard of the vehicle or attached somewhere else in the driver cabin.

The camera unit and the monitoring unit are connected to each other via suitable data connections in order to transfer recorded image data from the camera unit to the monitoring unit. The monitoring unit comprises a processor suitable to process the image data received from the camera unit in order to display the recorded image in the display area. Here, the display area and/or the recorded image area may be sized in such a way that the size of the recorded image exceeds the display area resulting in displaying only a part of the recorded image on the display area. In this case, changing the displayed part of the recorded image on the display area does not require panning of the camera, but can be executed by shifting the displayed part across the recorded image to the desired part of the recorded image to be shown in the display area.

Panning of the camera can be performed via an actuator unit suitable to adjust the camera unit between certain end positions. The movement can be executed mechanically, magnetically or thermally/electronically by applying suitable actuators. A mechanic solution might be a spring, which is tensioned or relaxed. A magnetic solution may apply electromagnets pulling or pushing the camera along guiding means from one position to the other and vice versa. A thermal/electronical solution might be applied as a bi-metal actuator. Skilled people are able to further consider other actuators suitable to move the camera to the desired position determining the viewing direction.

The term "static indication pattern" denotes a visible pattern, which may have any suitable shape, size, colour or transparency level and is displayed in addition to the recorded image to the driver. The term "static" denotes the property of the indication pattern, according to which the location (a) does not change relative to the display area and/or the location (b) indicates a particularly distinguished point in the recorded image that is independent on the image content, e.g. the vanishing point within the recorded image. A static indication pattern according to (a) will stay at its position on the display area even when the desired viewing direction (and therefore the image content of the shown image) is changed either by panning the camera or by adjusting the part of the recorded image visible on the display area. A static indication pattern according to (b) will stay at its position within the recorded image relative to the image content, however will move within the display area is case of panning the camera or by adjusting the part of the recorded image visible on the display area. The static indication pattern may comprise a pattern in accordance with (a) or with (b) and a combination of (a) and (b). In the latter case, it would e.g. be easy for the driver to adjust the vanishing point of the recorded image in the center of the display area.

The camera monitoring system according to the present disclosure enables the driver to easily adjust the displayed image to a direction or region of highest importance to improve the driving security by bringing the static indication pattern in coincidence with the direction or region of highest importance. Since the direction or region of highest importance is displayed in or near the center of the display the driver can pay the most attention to the area, which is best perceived by the driver in the middle of the display area.

In an embodiment the static indication pattern is an electronically provided pattern overlaying, preferably translucent overlaying, the recorded image shown on the display area of the monitoring unit. In this case, the overlay of static indication pattern and recorded image may be switched on and off or the overlay may be adapted electronically to the preferences of the driver on demand. After having adjusted the monitoring unit to the desired viewing direction, where the direction or region of highest importance is displayed in or near the center of the display, the static indication pattern may be switched off to only display the recorded image on the display area. In this case, the shown traffic situation can be observed by the driver without any disturbance by additional pattern.

In another embodiment the static indication pattern comprises a vanishing point in the recorded image shown on the display area. Lines that are parallel in reality converge at one point on the image denoted as the vanishing point. The vanishing point perspective makes a two-dimensional space appear three-dimensional. The indication of the vanishing point makes it possible for the driver to place the vanishing point close to or in the center of the display area to achieve the most three-dimensional appearance of the recorded image displayed on the display area.

In another embodiment the static indication pattern comprises a marker in a center of the display area of the monitoring unit. The marker can be established by any shape or size of the marker, e.g. by a closed or open point, by a cross, a horizontal line and a vertical line crossing in the center of the display area or a combination of the previous possibilities. The marker can be provided alone or in combination with an additional vanishing point on the display area. In the latter case, it is easy to bring both indicators to coincidence, when the direction or region of highest importance is in direction of the vanishing point, which is the case when driving along streets, where the traffic to be observed essentially is in a direction behind the vehicle.

In another embodiment the marker comprises a cross established by two lines crossing each other in an angle of 90 degrees. This provides a good visibility of the marker and enables the driver to align the display area horizontally.

In another embodiment the static indication pattern comprises a grid dividing the display area in different sub-areas with a center area of the display area. This enables the driver to easily adjust the direction or region of highest importance within the center area and therefore in or close to the center of the display area to enable the driver to direct his attention to the direction or region of highest importance leaving a certain degree of freedom to the driver, where the vanishing point of the image is exactly placed In another embodiment the grid is established by straight lines arranged in columns and rows, where the column lines are aligned perpendicularly to the row lines and where the column lines are parallel to each other and the row lines are parallel to each other. The grid lines aligned perpendicularly to each other makes it easy for the driver to adjust the direction or region of highest importance close to the center of the display area, since the display area is often shaped as an area with essentially rectangular shape. In another embodiment the monitoring unit and the display area may be suitably adapted and shaped enabling a horizontal adjustment of the row lines.

In another embodiment the grid is positioned in the display area to divide the display area in grid sub-areas, where at least the center area is dimensioned according to a golden ratio with a horizontal dimension as longer dimension. The golden ratio is a design rule that describes the division ratio of a distance to another size. The ratio is 1:1.618 and many people find it particularly harmonious. The golden section, sometimes also called the continuous division of a line, describes its division into two sections in such a way that the longer section relates to the shorter section in the same way as the total section relates to the longer section.

In another embodiment the static indication pattern comprises a sub-area within the display area representing a normative required field of view. Here, the driver has a certain range guided by the sub-area to adjust the direction or region of highest importance near to the center of the display.

In another embodiment the sub-area comprises a shaded area and/or a framed area. The shading or framing ensures the sub-area to be easily recognized by the driver. Also, the traffic situation is still visible through the sub-area to maintain driving security and proper adjustment of the direction or region of highest importance into the sub-area.

In another embodiment the camera monitoring system is adapted to provide lines in the display area representing a continuation of outer edges of the vehicle and/or a central axis of the vehicle rearwardly from the vehicle. This provides an additional criterium for fine-adjustment of the monitoring unit to place the direction or region of highest importance near to the center of the display.

In another embodiment the monitoring unit is adapted to be panned manually, where the camera monitoring system is adapted to move the part of the recorded image shown in the display area in accordance with the panning of the monitoring system. Here, the driver can quickly adjust the display area to the direction or region of highest importance while only facing the display area.

The disclosure further relates to a vehicle comprising at least one camera monitoring system according to the present disclosure. In an embodiment of the vehicle the camera monitoring system provides an interior mirror, with the central line of the vehicle defining the desired viewing direction and/or the camera unit being mounted at the rear of the vehicle. Thus, in case the certain viewing direction of the camera unit and/or the attachment of the camera unit to the vehicle is offset with respect to the central line of the vehicle, such that the middle of the recorded image is not aligned with the central line of the vehicle, the present disclosure allows for the viewing direction adjustment to align the recorded image or recorded image part visible on the display area with the central line of the vehicle to display the recorded scenery around the vehicle as if the certain viewing direction of the camera unit and/or the attachment of the camera unit to the vehicle would not be offset with respect to the central line of the vehicle.

The vehicle according to the present disclosure can be driven with improved driving security due to the use of the camera monitoring system according to the present disclosure enabling the driver to easily adjust the displayed image to a direction or region of highest importance. Since the direction or region of highest importance is displayed in or near the center of the display the driver can pay the most attention to the area, which is best perceived by the driver in the middle of the display area leading to an enhanced driving security.

The disclosure further relates to a method to providing a recorded image with improved driving security to a driver of the vehicle using a camera monitoring system according to the present disclosure, comprising following steps of:

recording a scenery around the vehicle with a certain viewing direction with a camera unit of the camera monitoring system;
    showing the recorded image of the scenery in a display area of a monitoring unit of the camera monitoring system;
    providing a static indication pattern in the display area in addition to the recorded image by the camera monitoring system, wherein preferably the static indication pattern is an electronically provided pattern overlaying the recorded image shown in the display area of the monitoring unit; and
    adjusting the desired viewing direction in relation to the static indication pattern by the driver, where the viewing direction of the camera is adjusted by panning the camera and/or, in case the recorded image has a size exceeding the display area of the monitoring unit resulting in shown and not-shown parts of the recorded image by adjusting the part of the recorded image visible on the display area to display the recorded scenery around the vehicle.

The method according to the present disclosure enables the driver to easily adjust the displayed image to a direction or region of highest importance to improve the driving security by bringing the static indication pattern in coincidence with the direction or region of highest importance.

Since the direction or region of highest importance is displayed in or near the center of the display the driver can pay the most attention to the area, which is best perceived by the driver in the middle of the display area.

In an embodiment of the method, where the static indication pattern comprises a marker in a center of the display area, the method comprises the step of bringing the desired viewing direction into coincidence with the marker.

In an embodiment of the method, where the static indication pattern comprises a grid dividing the display area in different sub-areas with a center area of the display area, the method comprises the step of placing the desired viewing direction into the center area of the display area.

In an embodiment of the method, where the grid is established by straight lines arranged in columns and rows, where the column lines are aligned perpendicularly to the row lines and where the column lines are parallel to each other and the row lines are parallel to each other, the method comprises the step of adjusting the row lines horizontally.

In an embodiment of the method, where the static indication pattern comprises a sub-area within the display area representing a normative required field of view, the method comprises the step of placing the desired viewing direction into the sub-area of the display area.

In an embodiment the method comprising the steps of
    providing vehicle position lines on the display area representing a continuation of an outer edges of the vehicle and/or a central axis of the vehicle rearwardly from the vehicle; and
    aligning the static indication pattern with the vehicle position line.

The embodiments described above can be combined with one another as desired by the person skilled in the art within the scope of the teaching according to the disclosure, also in deviation from the claim references.

BRIEF DESCRIPTION OF THE DRAWINGS

In the following, the disclosure and its embodiments are further explained with regard to the drawings, which show in.

DETAILED DESCRIPTION

Figure 1:
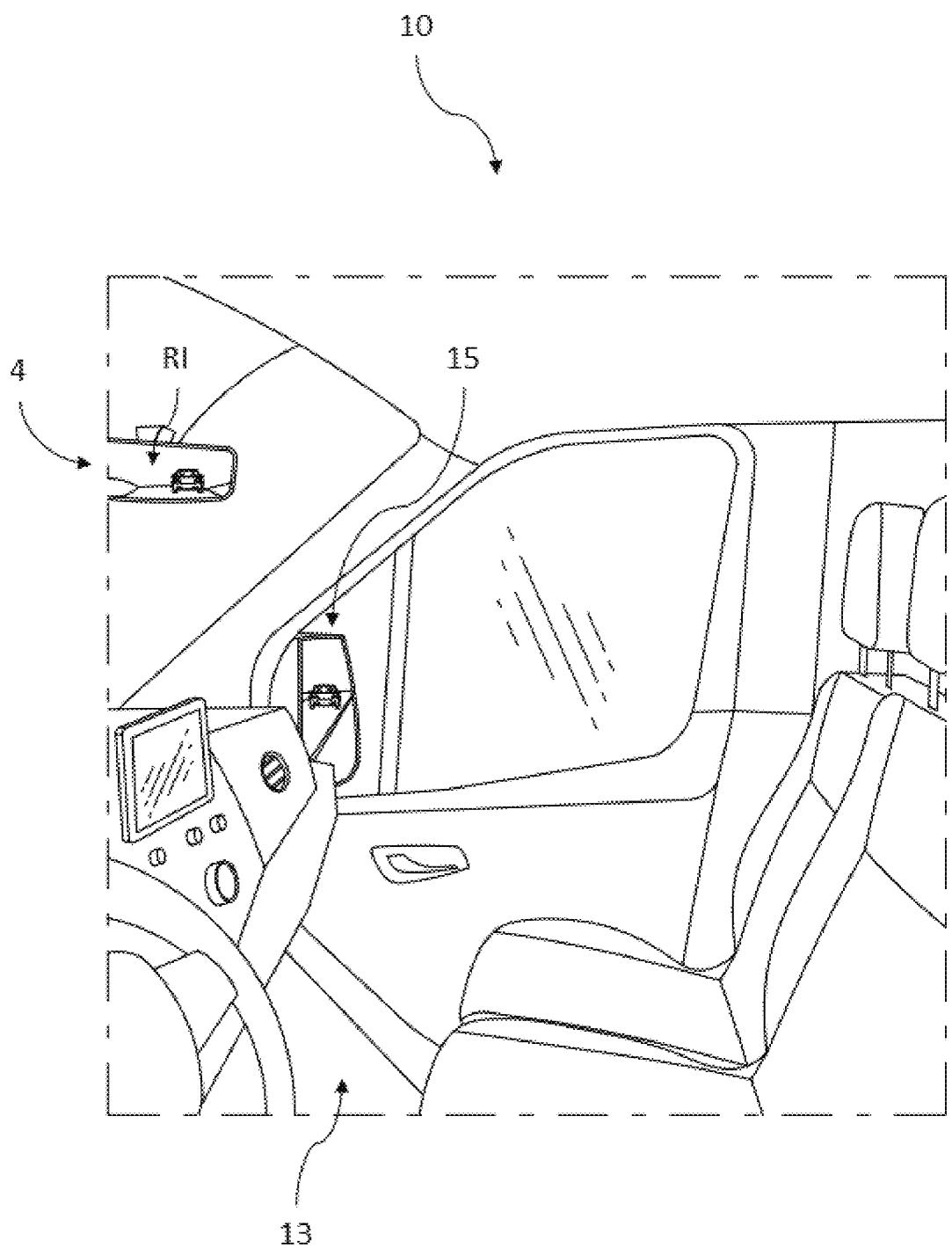
FIG. 1: a perspective view of a driver cabin comprising several monitoring units of a known camera monitoring system.
Figure 2:
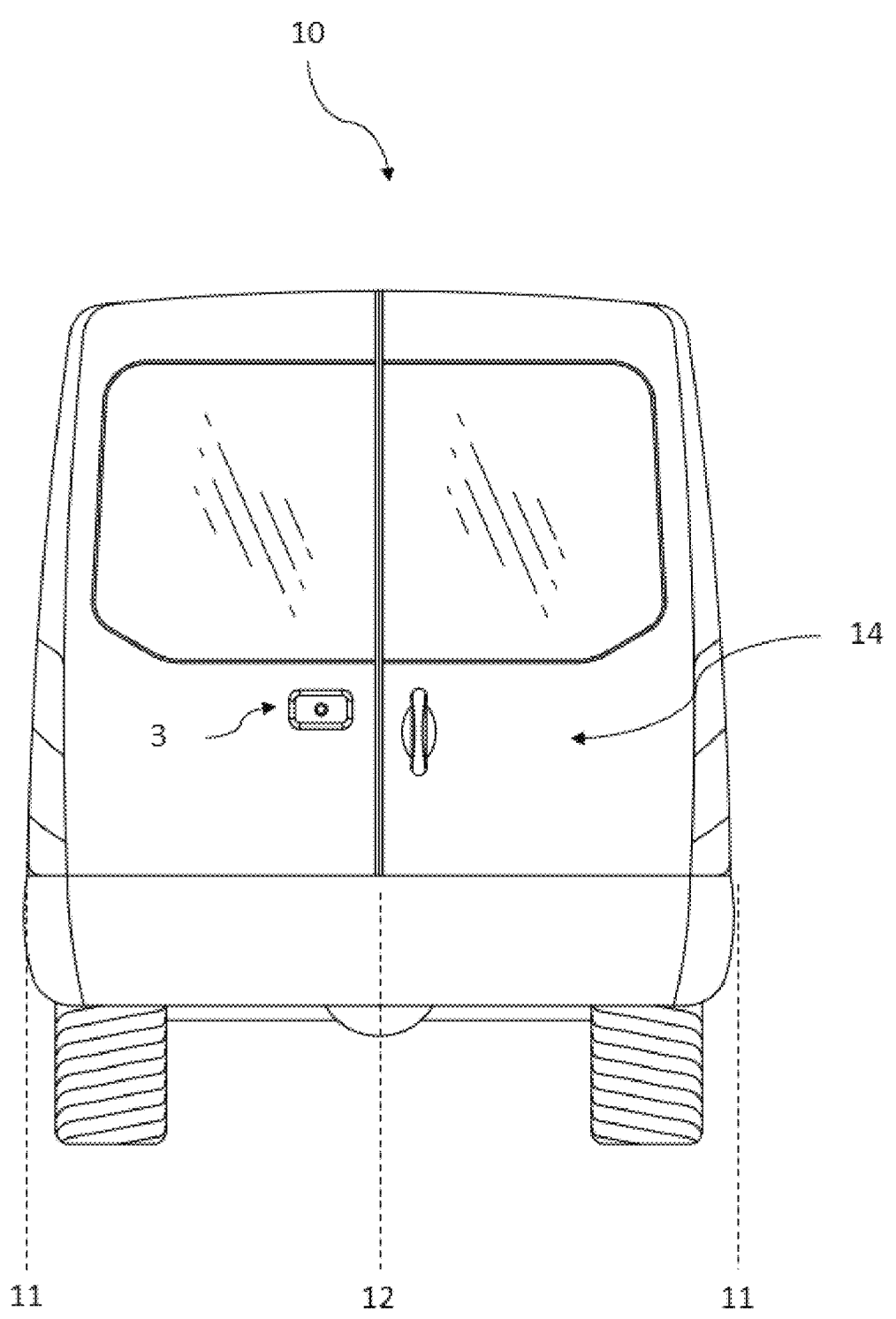
FIG. 2: a view of a rear of a vehicle, with a camera of the camera monitoring system of FIG. 1.
Figure 3:
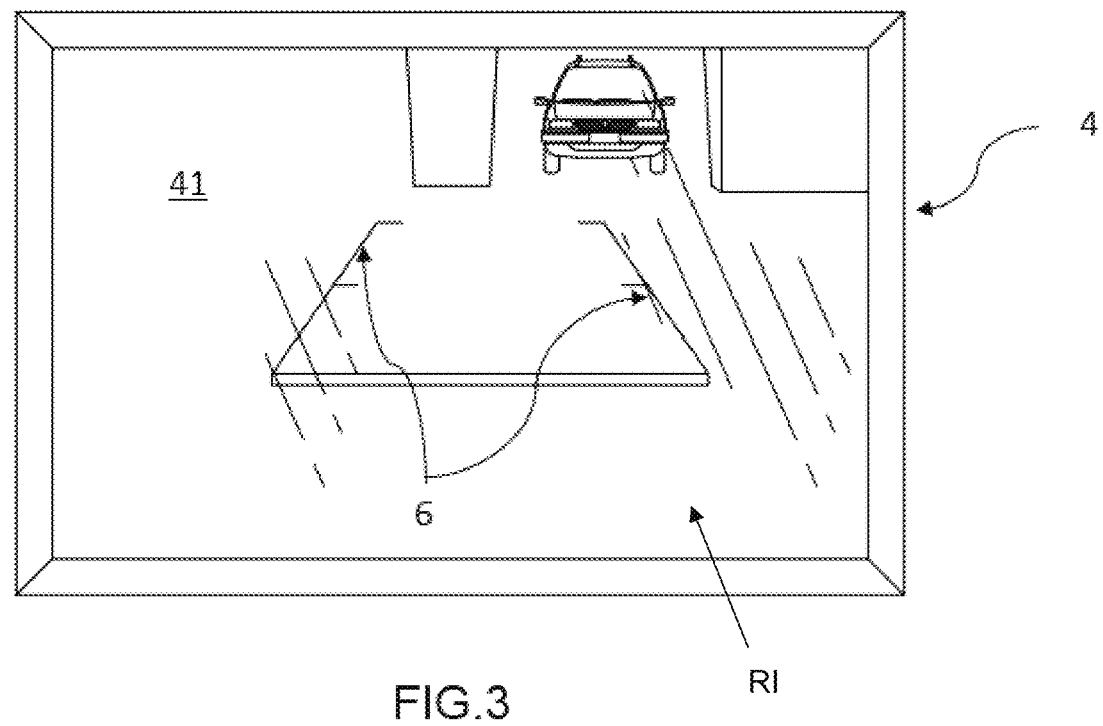
FIG. 3: a schematic view of a display screen as monitor of the camera monitoring system of FIG. 1, with a recorded image comprising lines indicating vehicle geometrics.
Figure 4:
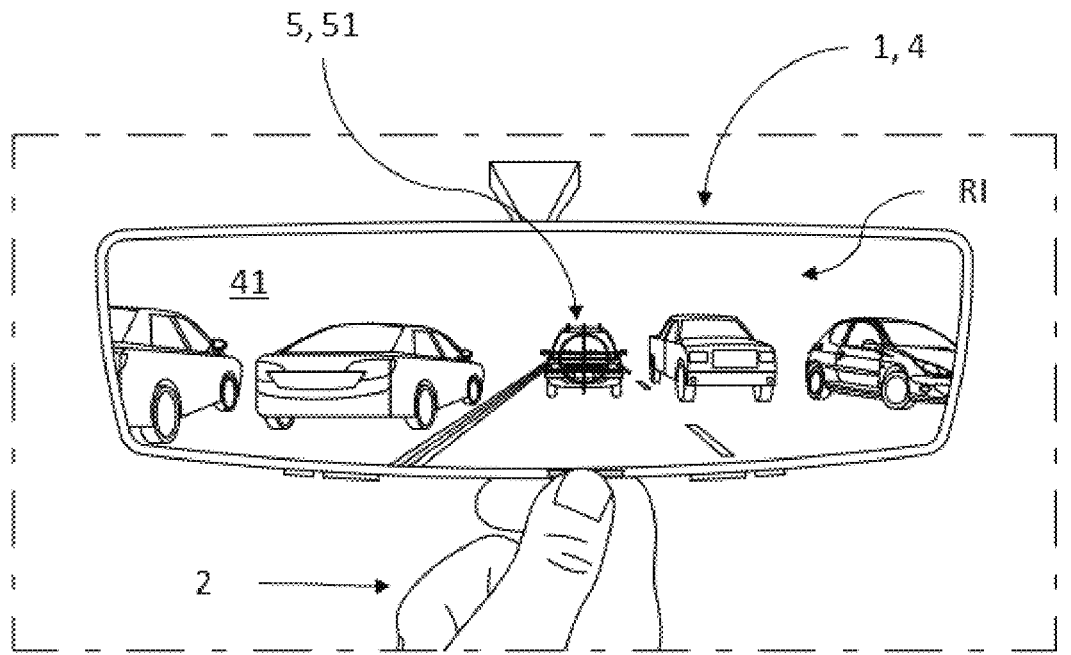
FIG. 4: a schematic view of an interior mirror as a monitoring unit of a camera monitoring system according to the present disclosure with a marker as static indication pattern.

FIG. 4 shows a schematic view of a virtual interior mirror with a monitoring unit 4 of a camera monitoring system 1 according to the present disclosure, with the monitoring unit 4 presenting a static indication pattern 5 comprising a marker 51.

The camera monitoring system 1 provides recorded images RI to a driver 2 of a vehicle 10 comprising a camera unit with at least one camera 3 recording a scenery around the vehicle 10 with a certain viewing direction, with the monitoring unit 4 showing the recorded image RI of the scenery, where the camera monitoring system 1 is adapted to provide the static indication pattern 5 on the display area 41 in addition to the recorded image RI enabling the driver 2 to adjust the desired viewing direction in relation to the static indication pattern 5 improving the driving security of the vehicle 10. The static indication pattern 5 may be an electronically provided pattern overlaying the recorded image RI shown on the display area 41 of the monitoring unit 4, such that the marker 51 is located in a center of the display area 41. The driver 2 may adjust the display area 41 in relation to the marker 51 by panning the camera 3 and/or, in case the recorded image RI has a size exceeding the display area 41 of the monitoring unit 4 resulting in shown and not-shown parts of the recorded image RI, by adjusting the part of the recorded image RI visible on the display area 41 to display the recorded scenery around the vehicle 10 in the desired viewing direction.

In the embodiments of FIG. 4, the static indication pattern 5 also indicates a vanishing point, which is shown in the recorded image RI and represents the direction or region of highest interest, wherein this vanishing point is brought into coincidence with the marker 51, which comprises a cross established by two lines crossing each other in an angle of 90 degrees.

Figure 5:
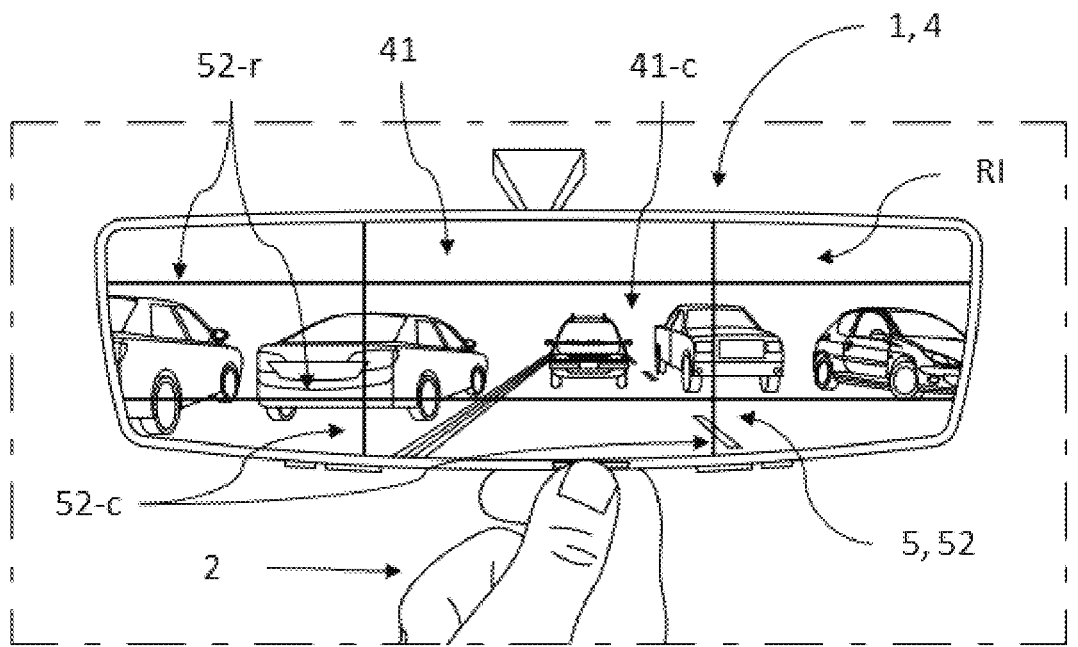
FIG. 5: a schematic view of an interior mirror as a monitoring unit of a camera monitoring system according to the present disclosure with a grid as static indication pattern.

FIG. 5 shows a schematic view of a virtual interior mirror as a monitoring unit 4 of a camera monitoring system 1 according to the present disclosure, with the monitoring unit 4 presenting a static indication pattern 5 comprising a grid 52. The grid 52 divides the display area 41 in different sub-areas with a center area 41-*c* of the display area 41. The grid 52 is established by straight lines 52-*r*, 52-*c* arranged in rows and columns, where the column lines 52-*c* are aligned substantially vertically parallel to each other and the row lines 52-*r* are aligned substantially horizontally and parallel to each other. The monitoring unit 4 and the display area 41 are suitably adapted and shaped for enabling a horizontal adjustment of the row lines 52-*r*. The grid 52 might be positioned onto the display area 41 to divide the display area 41 in grid parts, where at least the center area 41-*c* is dimensioned according to a golden ratio with a horizontal dimension as longer dimension (not shown here).

Figure 6:
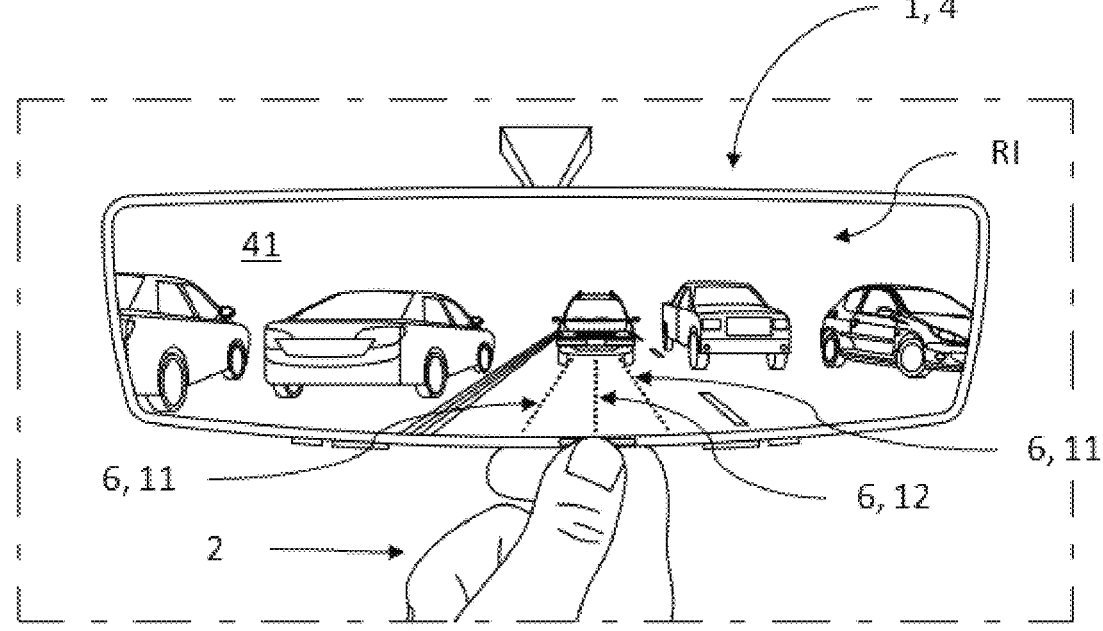
FIG. 6: a schematic view of an interior mirror as a monitoring unit of a camera monitoring system according to the present disclosure with lines indicating vehicle geometrics.

FIG. 6 shows a schematic view of a virtual interior mirror as a monitoring unit 4 of a camera monitoring system 1 according to the present disclosure, with the monitoring unit 4 presenting lines 6 indicating vehicle geometrics. The camera monitoring system 1 is adapted to provide the lines 6 on the display area 41 representing a continuation of outer edges 11 of the vehicle 10 and a central axis 12 of the vehicle

10 rearwardly of the vehicle 10. These lines 6 may still be present even when the static indication pattern 5 may be switched off after adjustment of the monitoring unit 4. Further, these lines 6 may be used as additional indicators to adjust the monitoring unit 4 to ensure that the direction or region of interest is located in the center of the display area 41.

Figure 7:
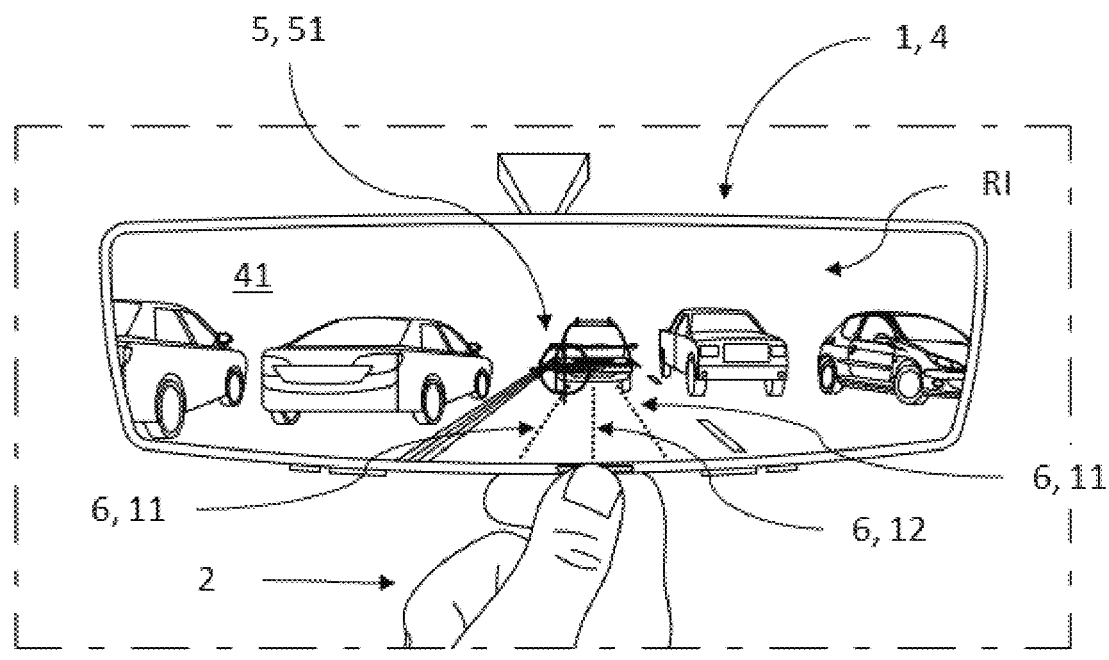
FIG. 7: a schematic view of an interior mirror as a monitoring unit of a camera monitoring system according to the present disclosure with a marker as static indication pattern together with lines indicating vehicle geometrics.

FIG. 7 shows a schematic view of a virtual interior mirror as a monitoring unit 4 of a camera monitoring system 1 according to the present disclosure, with the monitoring unit 4 presenting the marker 51 as the static indication pattern 5 together with the lines 6 indicating vehicle geometrics, as described with reference to FIG. 4 and FIG. 6, respectively. Thus, in the embodiment of FIG. 7 the marker 51 is still switched on to overlay with the lines 6 and the recorded image RI.

Figure 8:
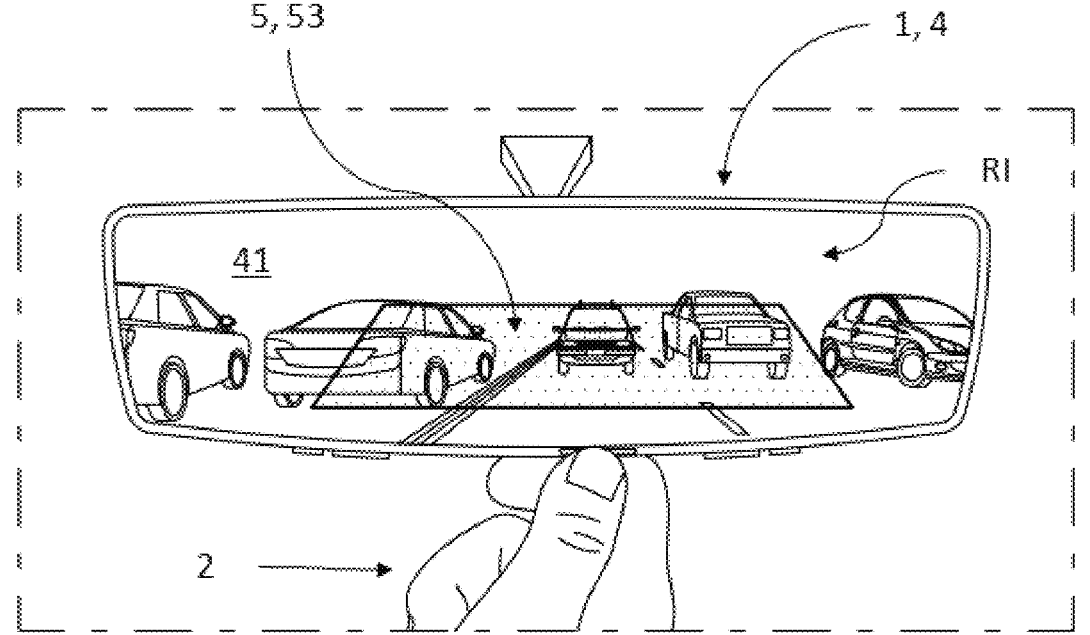
FIG. 8: a schematic view of an interior mirror as a monitoring unit of a camera monitoring system according to the present disclosure with a shaded sub-area as static indication pattern.

FIG. 8 shows a schematic view of a virtual interior mirror as a monitoring unit 4 of a camera monitoring system 1 according to the present disclosure, with the monitoring unit 4 presenting a shaded sub-area 53 as static indication pattern 5 for representing a normative required field of view. The sub-area 53 may be a shaded and framed area in form of a translucent overlay to the recorded image RI shown on the monitoring unit 4. The other static indication pattern 5 discussed with respect to each one of FIG. 4-7 may also be translucent pattern.

The monitoring unit 4 may present a shaded sub-area as static indication pattern 5.

The vehicle 10 may comprise a central rear-view mirror as part of a separate camera monitoring systems 1 provided by a dashboard.

In all embodiment of the camera monitoring system 1 according to the present disclosure, the monitoring unit 4 may be adapted to be panned manually, where the camera monitoring system 1 is adapted to move the part of the recorded image RI shown on the display area 41 in accordance with the panning of the monitoring system 4.

Figure 9:
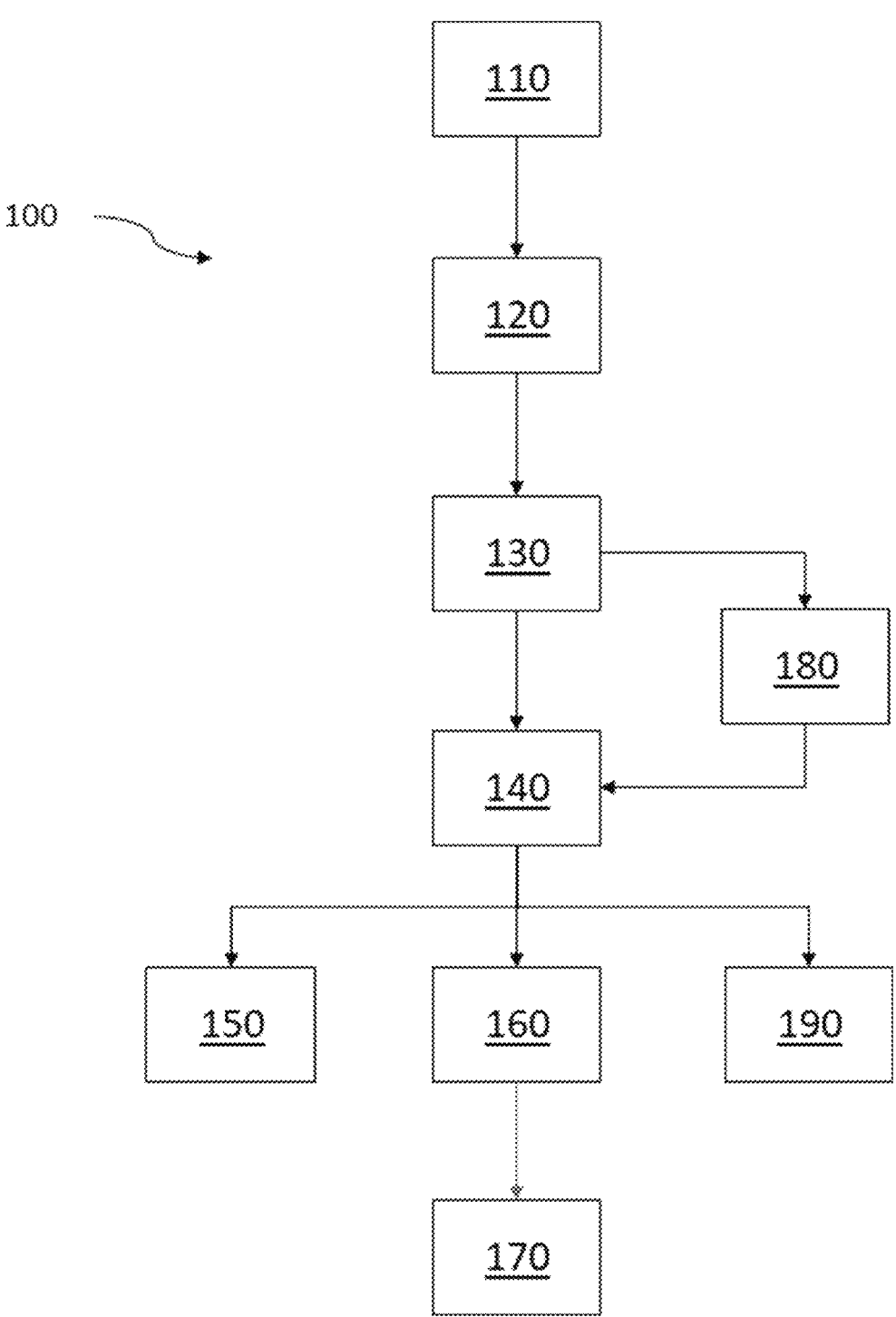
FIG. 9: a schematic view of the method according to the present disclosure.

FIG. 9 shows a schematic view of the method 100 for providing a recorded image RI according to the present disclosure for improved driving security to a driver 2 of a vehicle 10 using a camera monitoring system 1 according to the present disclosure. The method 100 comprises the steps of recording 110 a scenery around the vehicle 10 with a certain viewing direction via a camera 3 of the camera monitoring system 1; showing 120 the recorded image RI of the scenery on a display area 41 of a monitoring unit 4 of the camera monitoring system 1; providing 130 a static indication pattern 5 on the display area 41 in addition to the recorded image RI by the camera monitoring system 1, wherein preferably the static indication pattern 5 is an electronically provided pattern overlaying the recorded image RI shown on the display area 41 of the monitoring unit 4; and adjusting 140 the desired viewing direction relative to the static indication pattern 5 by the driver 2, wherein the viewing direction of the camera 3 is adjusted by panning the camera 3 and/or the recorded image RI has a size exceeding the display area 41 of the monitoring unit 4 resulting in shown and not-shown parts of the recorded image RI and the part of the recorded image RI visible on the display area 41 is adjusted to display the recorded scenery around the vehicle 10.

In case the static indication pattern 5 comprises a marker 51 in a center of the display area 41, the method 100 may further comprise the step of bringing 150 the desired viewing direction into coincidence with the marker 51.

In case the static indication pattern 5 comprises a grid 52 dividing the display area 41 in different sub-areas with a center area 41-*c* of the display area 41, the method 100 may further comprise the step of placing 160 the desired viewing direction into the center area 41-*c* of the display area 41.

In case the grid 52 is established by straight lines 52-*r*, 52-*c* arranged in columns and rows, where the column lines 52-*c* are aligned substantially perpendicularly to the row lines 52-*r* and where the column lines 52-*c* are parallel to each other and the row lines 52-*r* are parallel to each other, the method 100 may further comprise the step of adjusting 170 the row lines 52-*r* horizontally.

In case the static indication pattern 5 comprises a sub-area 53 within the display area 41 representing a normative required field of view, the method 100 may further comprise the step of placing 160 the desired viewing direction into the sub-area 53 of the display area 41.

The method 100 may also comprise the steps of providing 180 vehicle position lines 6 on the display area 41 representing a continuation of outer edges 11 of the vehicle 10 and/or a central axis 12 of the vehicle 10 rearwardly of the vehicle 10; and aligning 190 the static indication pattern 5 with the vehicle position lines 6.

Although subject matter of the present disclosure has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

REFERENCE SIGNS 1 camera monitoring system according to the present disclosure
2 driver of the vehicle
3 camera of the camera monitoring system
4 monitoring unit of the camera monitoring system
5 static indication pattern on the display area
6 vehicle position lines representing a continuation of the vehicle to the rear
7 vehicle
11 outer edges of the vehicle
12 central axis of the vehicle
13 driver cabin
14 rear of the vehicle
41 display area of the monitoring unit
41-*c* center area of the display area
51 marker in a center of the display area
52 grid on the display area
52-*r* row lines of the grid
52-*c* column lines of the grid
100 method according to the present disclosure providing a recorded image with improved driving security to a driver of the vehicle
110 recording a scenery around the vehicle with a camera
120 showing the recorded image of the scenery on a display area of a monitoring unit
130 providing a static indication pattern on the display area in addition to the recorded image
140 adjusting the desired viewing direction relative to the static indication pattern by the driver
150 bringing the desired viewing direction into coincidence with the marker
160 placing the desired viewing direction into the center area or sub-area representing a normative required field of view of the display area
170 adjusting the row line horizontal 180 providing vehicle position lines on the display area representing a continuation of an outer edges of the vehicle and/or a central axis of the vehicle rearwardly from the vehicle
190 aligning the static indication pattern with the vehicle position lines
RI recorded image

The invention claimed is:

1. A camera monitoring system adapted for use with a vehicle and providing a recorded image to a driver of the vehicle, comprising a camera unit for recording a scenery around the vehicle with a certain viewing direction and a monitoring unit for displaying the recorded image of the scenery, wherein the viewing direction can be adjusted by panning the camera unit or, in case the recorded image has a size exceeding a display area of the monitoring unit resulting in shown and not-shown parts of the recorded image, by adjusting the part of the recorded image visible on the display area to display the recorded scenery around the vehicle in a desired viewing direction, wherein the camera monitoring system is adapted to at least temporarily or on demand provide a static indication pattern in the display area in addition to the recorded image enabling the driver to adjust the desired viewing direction relative to the static indication pattern improving the driving security of the vehicle, wherein the camera monitoring system provides an interior mirror, with a central line of the vehicle defining the desired viewing direction or the camera unit being mounted at the rear of the vehicle, and wherein the certain viewing direction of the camera unit or the attachment of the camera unit to the vehicle is offset with respect to the central line of the vehicle, such that the middle of the recorded image is not aligned with the central line of the vehicle, and the viewing direction adjustment is suited to align the recorded image or recorded image part visible on the display area with the central line of the vehicle to display the recorded scenery around the vehicle as if the certain viewing direction of the camera unit or the attachment of the camera unit to the vehicle would not be offset with respect to the central line of the vehicle.

2. The camera monitoring system according to claim 1, wherein the static indication pattern is an electronically provided pattern overlaying, preferably translucent overlaying, the recorded image shown on the display area of the monitoring unit.

3. The camera monitoring system according to claim 1, wherein the static indication pattern comprises a vanishing point in the recorded image shown on the display area.

4. The camera monitoring system according to claim 1, wherein the static indication pattern comprises a marker in a center of the display area of the monitoring unit.

5. The camera monitoring system according to claim 4, wherein the marker comprises a cross established by two lines crossing each other in an angle of substantially 90 degrees.

6. The camera monitoring system according to claim 1, wherein the static indication pattern comprises a grid dividing the display area in different sub-areas with a center area of the display area.

7. The camera monitoring system according to claim 6, wherein the grid is established by straight lines arranged in columns and rows, where the column lines are aligned substantially perpendicularly to the row lines and where the column lines are parallel to each other and the row lines are parallel to each other.

8. The camera monitoring system according to claim 7, wherein the monitoring unit and the display area are suitably adapted and shaped enabling a horizontal adjustment of the row lines.

9. The camera monitoring system according to claim 6, wherein the grid is positioned in the display area to divide the display area in grid parts, where at least the center area is dimensioned according to a golden ratio with a horizontal dimension as longer dimension.

10. The camera monitoring system according to claim 1, wherein the static indication pattern comprises a sub-area within the display area representing a normative required field of view.

11. The camera monitoring system according to claim 10, wherein the sub-area comprises a shaded area or a framed area.

12. The camera monitoring system according to claim 1, wherein the camera monitoring system is adapted to provide lines in the display area representing a continuation of outer edges of the vehicle or a central axis of the vehicle rearwardly of the vehicle.

13. The camera monitoring system according to claim 1, wherein the monitoring unit is adapted to be panned manually, where the camera monitoring system is adapted to move the part of the recorded image shown on the display area in accordance with the panning of the monitoring system.

14. A vehicle comprising the camera monitoring system according to claim 1.

\* \* \* \* \*